(12) United States Patent
Bezawada et al.

(10) Patent No.: US 9,811,550 B2
(45) Date of Patent: Nov. 7, 2017

(54) SECURITY FOR MULTI-TENANT DEDUPLICATION DATASTORE AGAINST OTHER TENANTS

(71) Applicants: Venkata Krishna Venu Gopala Rao Bezawada, Hyderabad (IN); Subrahmanya Sarma Yellapragada, Hyderabad (IN); Ramakrishna Maddali, Prakasam Dt (IN)

(72) Inventors: Venkata Krishna Venu Gopala Rao Bezawada, Hyderabad (IN); Subrahmanya Sarma Yellapragada, Hyderabad (IN); Ramakrishna Maddali, Prakasam Dt (IN)

(73) Assignee: CA, Inc., New York, NY (US)

( * ) Notice: Subject to any disclaimer, the term of this patent is extended or adjusted under 35 U.S.C. 154(b) by 372 days.

(21) Appl. No.: 14/557,596

(22) Filed: Dec. 2, 2014

(65) Prior Publication Data

US 2016/0154839 A1 Jun. 2, 2016

(51) Int. Cl.

| G06F 17/30 | (2006.01) |
|---|---|
| G06F 21/62 | (2013.01) |
| G06F 21/64 | (2013.01) |
| H04L 29/08 | (2006.01) |

(52) U.S. Cl.
CPC .... *G06F 17/30371* (2013.01); *G06F 17/3033* (2013.01); *G06F 17/30156* (2013.01); *G06F 21/6218* (2013.01); *G06F 21/64* (2013.01); *G06F 21/645* (2013.01); *H04L 67/10* (2013.01)

(58) Field of Classification Search
CPC .......... G06F 17/30371; G06F 17/3033; G06F 17/30156; G06F 17/30; G06F 21/654; G06F 21/6218; G06F 21/64; G06F 17/3015; H04L 67/10; H04L 63/101; H04L 50/00; H04L 41/0654; H04L 67/141; H04L 49/15; H04L 63/166
See application file for complete search history.

(56) References Cited

U.S. PATENT DOCUMENTS

| 8,527,544 | B1 * | 9/2013 | Colgrove | G06F 3/0608 707/791 |
|---|---|---|---|---|
| 2011/0231362 | A1 * | 9/2011 | Attarde | G06F 11/3442 707/609 |
| 2012/0166448 | A1 * | 6/2012 | Li | G06F 17/3007 707/747 |
| 2013/0159648 | A1 * | 6/2013 | Anglin | G06F 11/1453 711/162 |

(Continued)

Primary Examiner — Anh Ly
(74) Attorney, Agent, or Firm — Baker Botts L.L.P.

(57) ABSTRACT

A method comprises receiving a first user hash value associated with data of a first user of a deduplication system, and comparing the first user hash value with each of a plurality of hash values stored in a first user hash store of the deduplication system. When it is determined that the first user hash value does not match one of the plurality of hash values stored in the first user hash store, first user hash value may be compared to each of a plurality of hash values stored in a global user hash store of the deduplication system associated with a plurality of users. When it is determined that the first user hash value matches one of the plurality of hash values stored in the global user hash store, the method may further comprise deleting the data after receiving the data associated with the first user hash value.

18 Claims, 4 Drawing Sheets

(56) References Cited

U.S. PATENT DOCUMENTS

| | | | |
|---|---|---|---|
| 2013/0339407 A1* | 12/2013 | Sharpe | G06F 17/30194 707/827 |
| 2014/0006465 A1* | 1/2014 | Davis | G06F 17/30194 707/827 |
| 2014/0007239 A1* | 1/2014 | Sharpe | G06F 21/561 726/24 |
| 2014/0188805 A1* | 7/2014 | Vijayan | G06F 11/1453 707/646 |
| 2015/0121522 A1* | 4/2015 | Guido | H04L 63/145 726/23 |

* cited by examiner

SECURITY FOR MULTI-TENANT DEDUPLICATION DATASTORE AGAINST OTHER TENANTS

BACKGROUND

The disclosure relates generally to providing security for users of a multi-tenant data deduplication system that eliminates duplicate copies of repeating data for intelligent data compression. In particular, this disclosure relates to limiting a user's ability to determine other user's data stored on the multi-tenant data deduplication system.

SUMMARY

According to one embodiment of the disclosure, a method comprises receiving a first user hash value associated with data of a first user of a deduplication system, and comparing the first user hash value with each of a plurality of hash values stored in a first user hash store of the deduplication system, the plurality of hash values stored in the first user hash store associated with the first user. When it is determined that the first user hash value matches one of the plurality of hash values stored in the first user hash store, first user hash value identifier may be sent to the first user. In addition, when it is determined that the first user hash value does not match one of the plurality of hash values stored in the first user hash store, the first user hash value may be compared to each of a plurality of hash values stored in a global user hash store of the deduplication system, the plurality of hash values stored in the global hash store associated with a plurality of users, and the plurality of users including the first user. Then, the data associated with the first user hash value may be requested from the first user, and the requested data may be received from the first user. In some embodiments, when it is determined that the first user hash value matches one of the plurality of hash values stored in the global user hash store, the method may further comprise discarding the data after receiving the data associated with the first user hash value from the first user. In some embodiments, wherein when it is determined that the first user hash value does not match one of the plurality of hash values stored in the global user hash store, the method may further comprise generating a new data hash value to be associated with the data, and storing the new data hash value.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Figure 1:
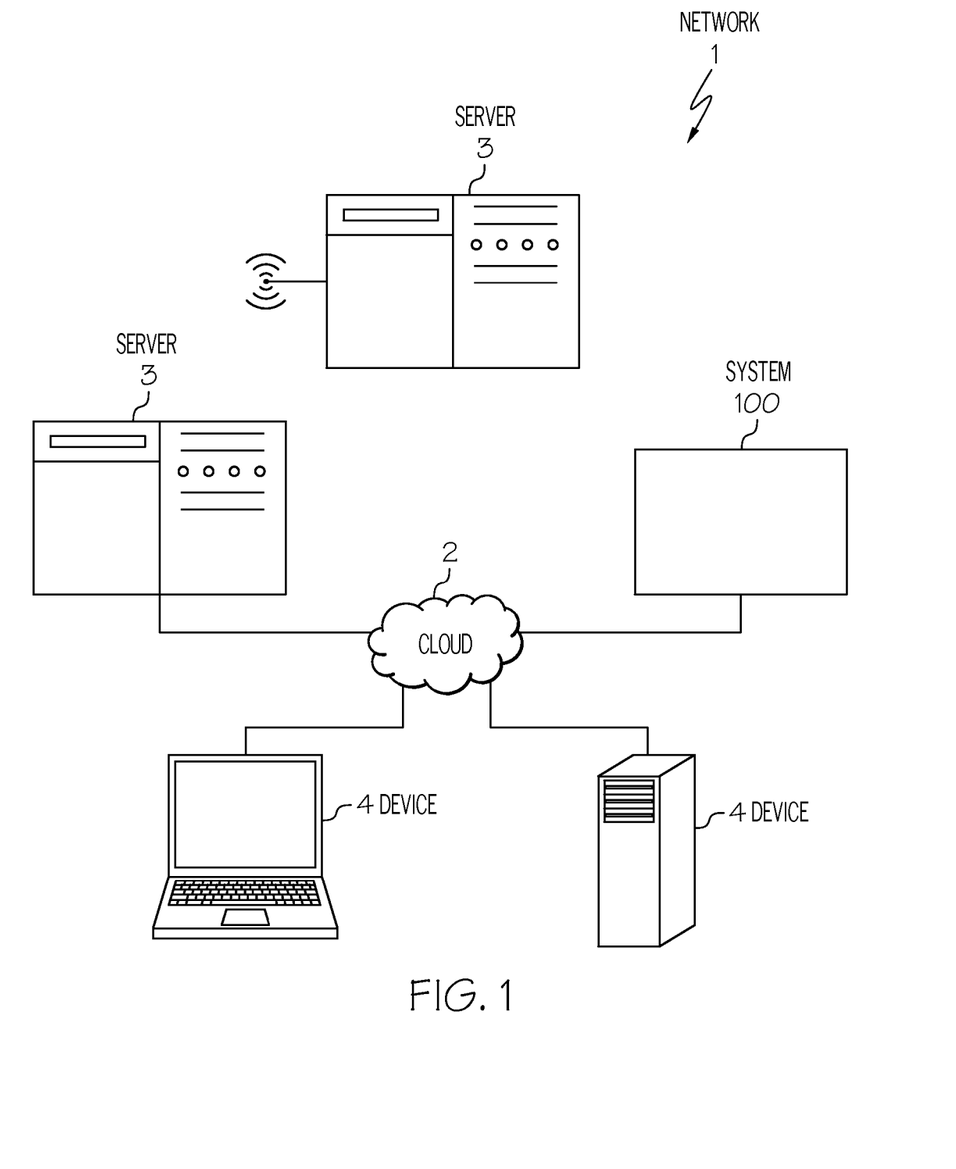
FIG. 1 illustrates a block diagram of a network for a user to access a data deduplication system, in accordance with a particular embodiment of the present disclosure.

Referring now to FIG. 1, a network 1 allows a user to access and use a multi-tenant data deduplication system. The multi-tenant data deduplication system may be internally provided or sourced through third parties. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide a multi-tenant data deduplication system. System 100 may be a multi-tenant storage system, and may be, for example, one or more of a general purpose computing device, a specialized computing device, a wired device, a wireless device, a mainframe device, an infrastructure device, a monitoring device, and any other device configured to provide a user-operation accountability module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information (including, e.g., user data and hash value information), document content information, and other information provided by service providers and users. By collecting the available information from network 1, cloud 2, servers 3, devices 4, and other devices connected to cloud 2, system 100 may perform one or more tasks associated with using the multi-tenant storage system 100, which is discussed in more detail below. In some configurations, one or more of servers 3 and devices 4 may comprise system 100. In other configurations, system 100 may be separate from servers 3 and devices 4.

Figure 2:
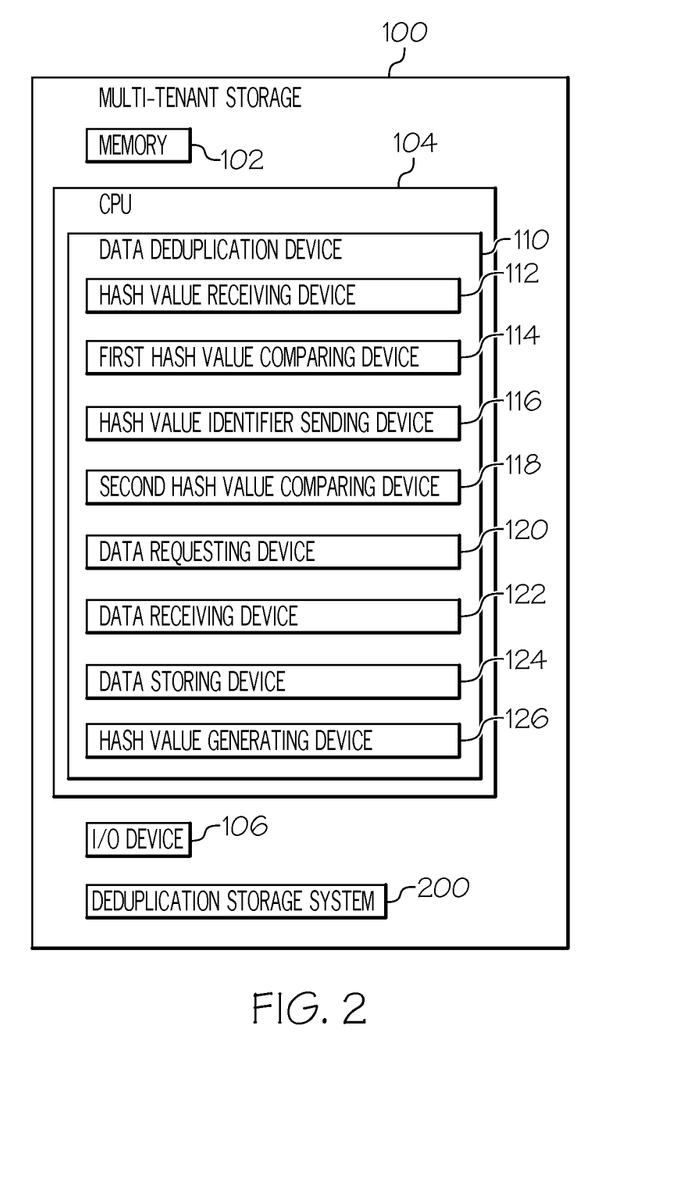
FIG. 2 illustrates a block diagram of a system for presenting the data deduplication system, in accordance with a particular embodiment of the present disclosure.

Referring now to FIG. 2, multi-tenant storage system 100 is now described. Multi-tenant storage system 100 may connect to one or more networks 1. Multi-tenant storage system 100 may comprise a memory 102, a central processing unit ("CPU") 104, an input and output ("I/O") device 106, and a deduplication storage system 200 (explained in more detail with regard to FIG. 3 below).

Memory 102 may store computer-readable instructions that may instruct multi-tenant storage system 100 to perform certain processes. Memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as one or more of data deduplication device 110. Data deduplication device 110 may comprise a hash value receiving device 112, a first hash value comparing device 114, a hash value identifier sending device 116, a second hash value comparing device 118, a data requesting device 120, a data receiving device 122, a data storing device 124, and a hash value generating device 126.

I/O device 106 may receive one or more of data from networks 1, data from other devices connected to multi-tenant storage system 100, and input from a user and provide such information to CPU 104. I/O device 106 may transmit data to networks 1, may transmit data to other devices connected to mobile device 100, and may transmit information to a user (e.g., provide the user with hash value identifiers indicating hash values that already located in the user's has store, as discussed in more detail below). Further, I/O device 106 may implement one or more of wireless and wired communication between multi-tenant storage system 100 and other devices (e.g., user/tenant devices).

In today's information storage systems, data deduplication is a specialized data compression technique for the purpose of eliminating duplicate copies of repeating pieces of data. With the speed of transferring data becoming a paramount concern and storage space becoming a valuable commodity, techniques to improve storage utilization and reduce the amount of network data that must be transferred have become more and more important.

The data deduplication process specifically deals with identifying, processing, and storing unique chunks of data. For example, when newly-acquired data is being stored in a storage device, wherein the storage device is already a repository for certain previously-stored data, chunks of predetermined sizes of the newly-acquired data are analyzed and compared with the already-stored data for matches/duplication of the data. If a match occurs, the redundant chunk of data is replaced with a reference identifier to the stored chunk, and the redundant chunk of data would not be downloaded to the storage device since it already exists. In particular, the intent of storage-based data deduplication is to inspect large volumes of data and identify large sections (e.g., entire files, or large sections of files) that are identical so that only one copy of the actual data is stored in the storage device, and all other instances with be replaced with a reference to the stored copy. Because a given chunk of data may be repeated dozens, hundreds, or even thousands of times, where the match frequency is often dependent on the size of the chunk of data, the amount of data what must be transferred (e.g., via a network) and stored on the storage device may be greatly reduced.

In addition, at client devices (e.g., users who may or may not be associated with a deduplication storage system, and tenants who are already users associated with the deduplication storage system), the deduplication hash calculations are initially created so that blocks of data that have identical hashes to blocks of data already in the client device are not sent, and the client device simply creates internal links to reference the duplicated data. This results in avoiding unnecessary data being sent across the network and reducing traffic load on the network.

In one implementation of a deduplication storage system, a multi-tenant storage system may work with a plurality of tenant devices (e.g., devices associated with user 1, user 2, and user 3), and all of the data of users 1-3 are stored in the multi-tenant storage system and is deduplicated across (e.g., only a single copy of repeated data is stored in the storage system, and all duplicate copies are identified via a reference identifier to the location of the copy). In this example system, data from all the users is sent to the multi-tenant storage system over a network. In addition, in this example system, the users themselves each implement user-side deduplication (e.g., identical blocks of data are identified and internal links/identifiers created so that duplicated blocks of data stored on the user device is not sent to the multi-tenant storage system).

For example, the workflow of this implementation of the deduplication storage system may include: (1) tenant devices associated with a user splits data into blocks (e.g., block size is configurable) and determines hash values to be associated with the blocks of data; (2) tenant devices connect to the multi-tenant deduplication system and send the hash values to the system for searching and comparing (e.g., to locate any duplicate blocks of data); (3) when duplicate hash values are found, the system obtains the link/identifier for referencing the duplicated data, and also sends identifiers/references for this data that is already found to be present in the deduplication storage system; and (4) for the remaining unique hash values, the system obtains the data associated with the hash values and stores the data in the deduplication storage system.

However, a problem with this workflow is that because the deduplication storage system contains data for a plurality of users, a user associated with a device (e.g., a user device that may or may not already be part of the deduplication storage system) may adhocly create certain pieces of data and then create hash values associated with these pieces of data in order to determine whether or not this data is present in another user's data that is stored in the deduplication storage system. In other words, if a user associated with a tenant device wants to test a piece of data to see whether or not the piece of data exists in the deduplication store system that includes the repository of data stored by all tenants associated with the deduplication store system (i.e., test out what data another user may have stored in the system), the user can send a hash value associated with the piece of data and get back a notification of whether or not that piece of data is present in the deduplication storage system (i.e., that piece of data is data associated with at least one user that stores data in the deduplication store). Accordingly, there is a security vulnerability within this workflow in which a user can extract information on what data has been stored in the deduplication storage system by other users.

The teachings of the present disclosure may provide a multi-tenant deduplication storage system that includes a general data store that stores the data of all users associated with the system, a general hash value store that stores all hash values associated with duplicate data among the data of all, or alternatively, a portion of, the users associated with the system, and separate hash stores associated with each user of the system. In addition, the teachings of the present disclosure may provide for a system in which when hash values are sent from a user to the deduplication storage system, the system will only return references for the hash values that are already present in the user's specific hash store (i.e., the hash store specifically associated with the user/tenant) so that the user will not send any data associated with those hash values that are present in the user's hash store. On the other hand, when the hash values sent from the user to the deduplication storage system are not found in the user's specific hash store, the system will request that the data associated with these hash values be sent to the deduplication storage system.

The system may then determine whether or not the hash value matches any of the hash values in the general hash store (i.e., the hash store that stores all hash values associated with duplicate data among the data of the users associated with the system). If the system determines that the hash value is present in the general hash store (i.e., a copy of the data associated with the hash value is already present in the data store), the system will discard the received data associated with the hash value as duplicative of data already present in the general data store. However, if the system determines that the hash value is not present in the general hash store (i.e., the copy of the data associated with the hash value is new data and no duplicates are found), the system will store the received data associated with the hash value in the general data store. This ensures that the security vulnerability discussed above is no longer an issue, and thus a user cannot "fish" for data by sending hash values associated with test blocks of data for the purpose of determining whether or not the data has been stored by one or more of the other tenants/users of the multi-tenant deduplication storage system.

Figure 3:
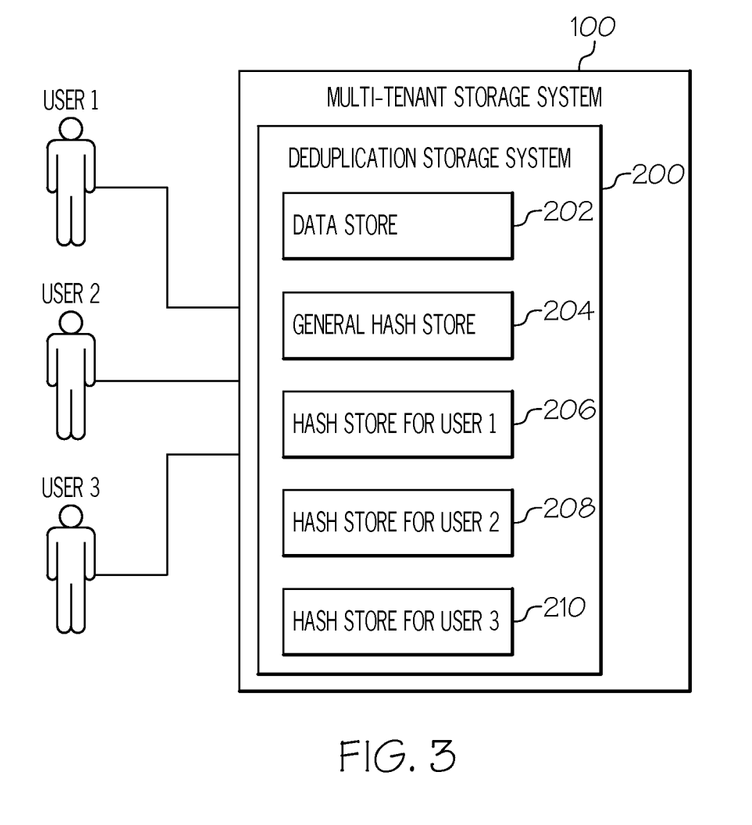
FIG. 3 illustrates a block diagram of the deduplication system component of the data deduplication system, in accordance with a particular embodiment of the present disclosure.

Referring now to FIG. 3, a multi-tenant storage system 100 with deduplication storage system 200 is now described. Multi-tenant storage system 200 is associated with a plurality of users. For example, and not by way of limitation, multi-tenant storage system 200 may be associated with user 1, user 2, and user 3.

Deduplication storage system 200 includes a data store 202, a general hash store 204, a hash store 206 for user 1, a hash store 208 for user 2, and a hash store 210 for user 3. Data store 202 may contain all data associated with users 1-33 that have been sent from users 1-3 for storage in multi-tenant storage system 200. General hash store 204 may contain all hash values associated with all the data stored in data store 202 (e.g., all data associated with user 1, user 2, and user 3), and may be used to determine whether there are duplicates of certain blocks of data.

Hash store 206 for user 1 contains all hash values associated with only data received from user 1 and stored in deduplication storage system 200, and may be used to determine whether there are duplicates of certain blocks of data for data only associated with user 1. In addition, hash store 208 for user 2 contains all hash values associated with only data received from user 2 and stored in deduplication storage system 200, and may be used to determine whether there are duplicates of certain blocks of data for data only associated with user 2. Likewise, hash store 210 for user 3 contains all hash values associated with only data received from user 3 and stored in deduplication storage system 200, and may be used to determine whether there are duplicates of certain blocks of data for data only associated with user 3.

Figure 4:
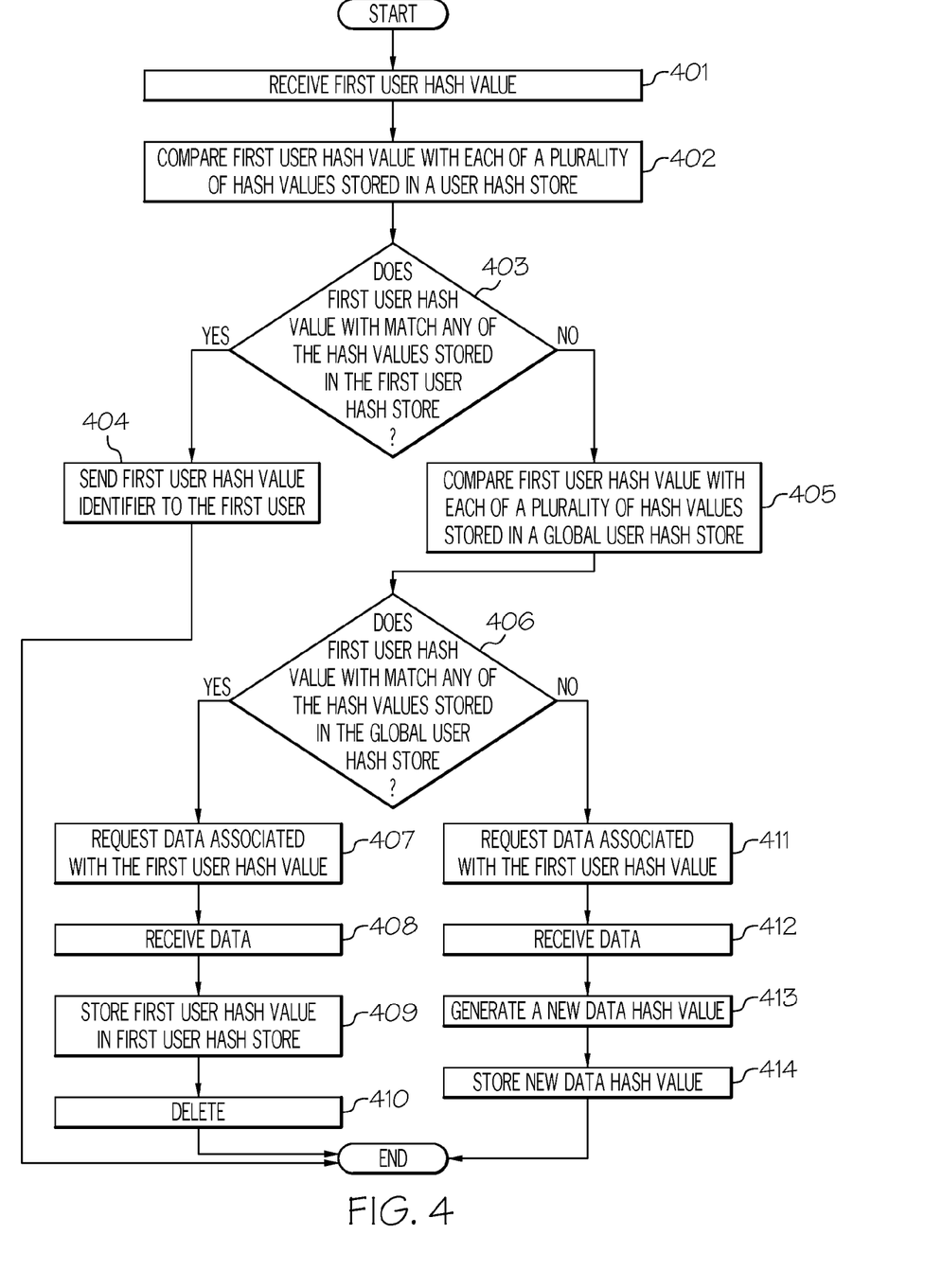
FIG. 4 illustrates a flow chart of a method for viding security for users of a multi-tenant data deduplication system, in accordance with a particular embodiment of the present invention.

Referring now to FIG. 4, processes performed by multi-tenant storage system 100 in conjunction with deduplication storage system 200 are now described. In step 401, data deduplication device 110, operating as a hash value receiving device 112, receives a first user hash value (e.g., a hash value associated with the first user's data that the first user wants to store in multi-tenant storage system 100). Then, in step 402, data deduplication device 110, operating as a first hash value comparing device 114, compares the first user hash value with each of a plurality of hash values stored in a first user hash store (e.g., hash store 206 for user 1 of deduplication storage system 200) to determine whether the first user hash value matches any of the hash values stored in the first user hash store.

When first hash value comparing device 114 determines that the first user hash value matches at least one of the hash values stored in the first user hash store (i.e., step 403: YES), then in step 404, data deduplication device 110, operating as a hash value identifier sending device 116, sends a first user hash value identifier to the first user to indicate that the data associated with the first user hash value is already stored in the storage device (e.g., data store 202 of deduplication storage system 200), and thus does not need to be transferred and/or downloaded from the first user. Once the user is notified, the process terminates.

On the other hand, when first hash value comparing device 114 determines that the first user hash value does not match at least one of the hash values stored in the first user hash store (i.e., step 403: NO), then in step 405, data deduplication device 110, operating as a second hash value comparing device 114, compares the first user hash value with each of a plurality of hash values stored in a global user hash store (e.g., general hash store 204 of deduplication storage system 200), wherein the plurality of hash values stored in the global user hash store is associated with a plurality of users (i.e., users 1-3), and the plurality of users includes the first user (i.e., user 1). Alternatively, because the first user hash value has already been compared with the hash values in the hash store associated with the first user (e.g., hash store 206 for user 1), the first user hash value may only be compared with all hash values in general hash store 204 not including the hash values associated with the first user. When second hash value comparing device 114 determines that the first user hash value matches any of the hash values stored in the global user hash store (i.e., step 406: YES), then in step 407, data deduplication device 110, operating as a data requesting device 120, requests from the user's/tenant's device data associated with the first user hash value. In other words, when second hash value comparing device 114 determines that although the first user hash value does not match the first user's hash values, but nonetheless matches another user's hash value as found in general hash store 204 (which includes all user's hash values, or alternatively all but the first user's hash values), data requesting device 120 requests the data associated with the hash value even through a copy of the data is already stored in data store 202. This is for the purpose of limiting the first user's ability to determine what data associated with others users (i.e., data stored by these other users) is available and stored in data store 202, which is associated with all the users that store data in multi-tenant storage system 100. Then, in step 408, data deduplication device 110, operating as a data receiving device 122, receives the data from the first user, and in step 409, stores the first user hash value in the hash store associated with the first user (e.g., hash store 206 for user 1). This is so that if the first user sends the same data hash again, data deduplication device 110 will recognize that this data is already stored in general hash store 204, and thus will not send another request for the data. Then, in step 410, data deduplication device 110 discards the data (e.g., deletes the data). Once the data is discarded, the process terminates.

On the other hand, when second hash value comparing device 114 determines that the first user hash value does not match any of the hash values stored in the global user hash store (i.e., step 406: NO), then in step 411, data deduplication device 110, operating as data requesting device 120, requests data associated with the first user hash value from the first user. In other words, data deduplication device 110 has determined that the data associated with the first user hash value is not available in data store 202, and thus seeks to request this new data from the first user for storage. As such, in step 412, data deduplication device 110, operating as a data receiving device 122, receives the data from the first user, and then, in step 413, data deduplication device 110, operating as a hash value generating device 126 (e.g., a hash function), generates a new data hash value for the new data. Then, in step 414, data deduplication device 110, operating as data storing device 124, stores the new data hash value to hash store 206 for user 1 and general hash store 204, and also stores the new data in data store 202. After the data is stored and saved, the process terminates.

The flowchart and block diagrams in FIGS. 1-4 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving a first user hash value associated with data of a first user of a deduplication system, and
   comparing the first user hash value with each of a plurality of hash values stored in a first user hash store of the deduplication system, the plurality of hash values stored in the first user hash store associated with the first user,
   wherein when it is determined that the first user hash value matches one of the plurality of hash values stored in the first user hash store, sending a first user hash value identifier to the first user, and
   wherein when it is determined that the first user hash value does not match one of the plurality of hash values stored in the first user hash store,
   comparing the first user hash value to each of a plurality of hash values stored in a global user hash store of the deduplication system, the plurality of hash values stored in the global hash store associated with a plurality of users, and the plurality of users including the first user,
   requesting the data associated with the first user hash value from the first user, and
   receiving the requested data from the first user.

2. The method of claim 1, wherein when it is determined that that the first user hash value matches one of the plurality of hash values stored in the global user hash store, the method further comprises
   discarding the data after receiving the data associated with the first user hash value from the first user, and
   storing the first user hash value in the first user hash store.

3. The method of claim 1, wherein when it is determined that the first user hash value does not match one of the plurality of hash values stored in the global user hash store, the method further comprises:
   generating a new data hash value to be associated with the data, and
   storing the new data hash value.

4. The method of claim 3, wherein the new data hash value is stored in the first user hash store and the global user hash store.

5. The method of claim 1, wherein the first user hash value identifier is associated with a hash value of the plurality of hash values stored in the first user hash store that matches the received first user hash value.

6. The method of claim 1, wherein comparing the first user hash value to each of the plurality of hash values stored in the global user hash store comprises comparing the first user hash value to a plurality of hash values stored in the global user hash store associated with a plurality of users not including the first user.

7. A system comprising:
   a hash value receiving device configured to receive a first user hash value associated with data of a first user of a deduplication system, and
   a first hash value comparing device configured to compare the first user hash value with each of a plurality of hash values stored in a first user hash store of the deduplication system, the plurality of hash values stored in the first user hash store associated with the first user, and
   wherein when it is determined that the first user hash value does not match one of the plurality of hash values stored in the first user hash store, the system further comprises:
   a second hash value comparing device configured to compare the first user hash value to each of a plurality of hash values stored in a global user hash store of the deduplication system, the plurality of hash values stored in the global hash store associated with a plurality of users, and the plurality of users including the first user, and
   a data requesting device configured to request the data associated with the first user hash value from the first user, and
   a data receiving device configured to receive the data from the first user.

8. The system of claim 7, wherein when the second hash value comparing device determines that the first user hash value matches one of the plurality of hash values stored in the global user hash store, the data receiving device is further configured to
   send a first user hash value identifier to the first user, discard the data after the data associated with the first user hash value is received from the first user, and store the first user hash value in the first user hash store.

9. The system of claim 7, wherein when it is determined that the first user hash value does not match one of the plurality of hash values stored in the global user hash store, the system further comprises:

a hash value generating device configured to generate a new data hash value to be associated with the data, and a storage device configured to store the new data hash value.

10. The system of claim 9, wherein the new data hash value is stored in the first user hash store and the global user hash store.

11. The system of claim 7, wherein the first user hash value identifier is associated with a hash value of the plurality of hash values stored in the first user hash store that matches the received first user hash value.

12. The method of claim 7, wherein comparing the first user hash value to each of the plurality of hash values stored in the global user hash store comprises comparing the first user hash value to a plurality of hash values stored in the global user hash store associated with a plurality of users not including the first user.

13. A computer program product comprising:

a computer-readable storage medium having computer-readable program code embodied therewith, the computer-readable program code comprising:

computer readable program code configured to receive a first user hash value associated with data of a first user of a deduplication system, and computer readable program code configured to compare the first user hash value with each of a plurality of hash values stored in a first user hash store of the deduplication system, the plurality of hash values stored in the first user hash store associated with the first user, computer readable program code configured to, when it is determined that the first user hash value does not match one of the plurality of hash values stored in the first user hash store:

compare the first user hash value to each of a plurality of hash values stored in a global user hash store of the deduplication system, the plurality of hash values stored in the global hash store associated with a plurality of users, and the plurality of users including the first user, request the data associated with the first user hash value from the first user, and receive the data from the first user.

14. The computer program product of claim 13, wherein when it is determined that that the first user hash value matches one of the plurality of hash values stored in the global user hash store, computer readable program code is further configured to send a first user hash value identifier to the first user, discard the data after the data associated with the first user hash value is received from the first user, and store the first user hash value in the first user hash store.

15. The computer program product of claim 14, wherein when it is determined that the first user hash value does not match one of the plurality of hash values stored in the global user hash store, computer readable program code is further configured to:

generate a new data hash value to be associated with the data, and store the new data hash value.

16. The computer program product of claim 15, wherein the new data hash value is stored in the first user hash store and the global user hash store.

17. The computer program product of claim 13, wherein the first user hash value identifier is associated with a hash value of the plurality of hash values stored in the first user hash store that matches the received first user hash value.

18. The computer program product of claim 13, wherein comparing the first user hash value to each of the plurality of hash values stored in the global user hash store comprises comparing the first user hash value to a plurality of hash values stored in the global user hash store associated with a plurality of users not including the first user.

* * * * *